United States Patent
Ozaki et al.

(10) Patent No.: US 10,048,991 B2
(45) Date of Patent: Aug. 14, 2018

(54) SYSTEM AND METHOD FOR PARALLEL PROCESSING DATA BLOCKS CONTAINING SEQUENTIAL LABEL RANGES OF SERIES DATA

(71) Applicant: HITACHI, LTD., Tokyo (JP)

(72) Inventors: Hiroaki Ozaki, Tokyo (JP); Keiro Muro, Tokyo (JP)

(73) Assignee: HITACHI, LTD., Tokyo (JP)

( * ) Notice: Subject to any disclaimer, the term of this patent is extended or adjusted under 35 U.S.C. 154(b) by 23 days.

(21) Appl. No.: 14/902,184

(22) PCT Filed: Jul. 1, 2013

(86) PCT No.: PCT/JP2013/067972
§ 371 (c)(1),
(2) Date: Dec. 30, 2015

(87) PCT Pub. No.: WO2015/001596
PCT Pub. Date: Jan. 8, 2015

(65) Prior Publication Data
US 2016/0203032 A1    Jul. 14, 2016

(51) Int. Cl.
*G06F 9/52* (2006.01)
*G06F 17/30* (2006.01)
(Continued)

(52) U.S. Cl.
CPC .............. *G06F 9/52* (2013.01); *G06F 9/46* (2013.01); *G06F 9/5066* (2013.01);
(Continued)

(58) Field of Classification Search
None
See application file for complete search history.

(56) References Cited

U.S. PATENT DOCUMENTS 6,408,359 B1 *  6/2002  Ito ...................... H04N 7/17336
                                                                  348/E7.073
7,415,572 B2 *  8/2008  Tsubakihara .......... G06F 3/0613
                                                                  386/E9.013
(Continued)

FOREIGN PATENT DOCUMENTS

JP         2006-252394 A       9/2006
JP         2007201532 A   *   8/2007   ............. H04N 1/413
(Continued)

OTHER PUBLICATIONS

Bach et al, Power Grid Time Series Data Analysis with Pig on a Hadoop Cluster compared to Multi Core Systems; 2012, IEEE, 2013 21st Euromicro International Conference on Parallel, Distributed, and Network-Based Processing; pp. 208-212.*
(Continued)

*Primary Examiner* — Abu Ghaffari
(74) *Attorney, Agent, or Firm* — Volpe and Koenig, P.C.

(57) ABSTRACT

A series data distributed processing system including a parallel processing system and a distributed series data management unit managing distributed series data, wherein: the parallel processing system includes, on each computing device, a data block, a data block processing server for processing the data block, and a block processing integration server for processing a result from the data block processing server, the data block being formed from a plurality of values each associated with one of a plurality of sequential labels in the series data; and the distributed series data management unit includes a distributed information management database for managing data blocks, which retains management data, including sequential label ranges, which refer to ranges of sequential labels in the data blocks, series IDs corresponding to value names in the data blocks, and
(Continued)

meta-information identifying computing devices retaining the data blocks.

5 Claims, 17 Drawing Sheets

(51) Int. Cl.
  *G06F 9/50* (2006.01)
  *G06F 9/46* (2006.01)
  *G06F 17/14* (2006.01)
(52) U.S. Cl.
  CPC ...... *G06F 17/30595* (2013.01); *G06F 9/5083* (2013.01); *G06F 17/142* (2013.01)

(56) References Cited

U.S. PATENT DOCUMENTS

| | | | | |
|---|---|---|---|---|
| 8,938,416 | B1* | 1/2015 | Cole | G06F 17/30592 707/607 |
| 9,195,700 | B1* | 11/2015 | Becker | G06F 17/30336 |
| 9,229,657 | B1* | 1/2016 | Rus | G06F 3/0643 |
| 9,477,784 | B1* | 10/2016 | Bhave | G06F 17/30979 |
| 2004/0044899 | A1* | 3/2004 | Gaya | H04L 29/06 713/193 |
| 2004/0078405 | A1* | 4/2004 | Bhanot | G06F 9/52 708/404 |
| 2005/0246161 | A1* | 11/2005 | Sakurai | G06Q 30/02 704/10 |
| 2008/0086442 | A1* | 4/2008 | Dasdan | G06F 17/30584 |
| 2008/0133633 | A1* | 6/2008 | Bhanot | G06F 9/52 708/404 |
| 2008/0313213 | A1* | 12/2008 | Zhang | G06F 17/30592 |
| 2010/0005080 | A1* | 1/2010 | Pike | G06F 11/1482 707/E17.002 |
| 2010/0077176 | A1* | 3/2010 | Pearlstein | G06F 7/785 712/22 |
| 2010/0122065 | A1* | 5/2010 | Dean | G06F 17/30445 712/203 |
| 2010/0287554 | A1* | 11/2010 | Amundsen | G06F 9/466 718/101 |
| 2011/0023072 | A1* | 1/2011 | Hodzic | H04N 21/23109 725/95 |
| 2011/0179100 | A1 | 7/2011 | Kawai | |
| 2012/0246360 | A1* | 9/2012 | Tsuchida | G06T 1/60 710/65 |
| 2012/0254193 | A1 | 10/2012 | Chattopadhyay | |
| 2013/0007854 | A1* | 1/2013 | Sorenson, III | H04L 63/0823 726/5 |
| 2013/0013651 | A1* | 1/2013 | Shuma | G06F 17/30306 707/807 |
| 2013/0151647 | A1* | 6/2013 | Tatsumi | G06F 8/65 709/213 |
| 2013/0151926 | A1* | 6/2013 | Leggette | H04L 67/10 714/763 |
| 2013/0238619 | A1 | 9/2013 | Hanaoka et al. | |

FOREIGN PATENT DOCUMENTS

| | | |
|---|---|---|
| JP | 2011-150503 A | 8/2011 |
| JP | 2012-117987 A | 6/2012 |

OTHER PUBLICATIONS

Office action issued in corresponding chinese Patent Application No. 201380077504.7 dated Jul. 14, 2017, pp. 1-9 page (English Translation) (Year: 2017).*
Jeffrey Dean et al., Google, Inc. "MapReduce: Simplified Data Processing on Large Clusters", OSDI 2004, Dec. 6, 2014.
Jingren Zhou et al., "SCOPE: Parallel Databases Meet MapReduce", The VLDB Journal, Oct. 2012.
Office Action issued in corresponding Chinese Patent Application No. 201380077504.7 dated Jul. 14, 2017, consisting of 9 pp.

* cited by examiner

SYSTEM AND METHOD FOR PARALLEL PROCESSING DATA BLOCKS CONTAINING SEQUENTIAL LABEL RANGES OF SERIES DATA

BACKGROUND

The present invention pertains to a parallel distributed processing method and a computer system for processing large amounts of series data in parallel using a plurality of distributed computers.

In recent years, the field of big data processing is receiving attention, which analyzes and processes large amounts of data to find and make use of findings having never been previously obtained. In the field of big data, sensor data obtained from a device, for example, has a form of data called series data. Series data is a data set of a plurality of data pieces arranged in accordance with respective sequential labels, each of the plurality of data pieces consisting of values for a plurality of data items.

When there is a need for analysis of large amounts of data, it is necessary to design a system for each processing in existing distributed analysis systems, resulting in high cost of system configuration.

Concerning such an issue, the MapReduce framework is proposed as core technology for implementing analysis processing with ease as described in Patent Literature 1 and Non-Patent Literature 1. The MapReduce framework is a programming model for writing an analysis procedure of data in two parts: an extraction procedure (MAP procedure) that extracts desired data from data store, and an aggregation procedure (Reduce procedure) that transforms the extracted data into a readily usable form or statistic information. It allows the execution engine of the MapReduce framework to determine the division unit of an analysis application and to control parallel processing.

However, the MapReduce framework is originally aimed at writing processing of unstructured and non-sequential data such as a search system in the Web. Thus, it is impossible to expect an increase in the processing performance for series data from the MapReduce framework. For example, the extraction procedure is executed simultaneously at a large number of infrastructures as a plurality of tasks. Thus, it greatly contributes to enhancing the processing speed; however, it is difficult to apply an analysis method usually applied to series data, such as moving average calculation and Fourier transformation.

The aggregation procedure is used for writing such processing in the MapReduce framework; however, it is difficult in the aggregation processing to increase the number of infrastructures for the processing to enhance the processing speed.

Concerning such an issue, a technique to utilize a stream processing infrastructure in the aggregation processing for speedup is known, as described in Non-Patent Literature 2. However, even if using the stream processing infrastructure, there is a problem that a waiting time for all data to be extracted in the extraction processing occurs, and the transmission of the extracted data directly to another server via a network results in an increase in communication loads. Further, the aggregation processing of series data does not always reduce the amount of data sufficiently in the writing process of the result, and the relocation of large amounts of data leads to increases in the communication and processing loads or a reduction in the speed.

PRIOR ART

Patent Literature 1: US2008/0086442 A1
Non-Patent Literature 1: "MapReduce: Simplified Data Processing on Large Clusters" Jeffrey Dean, Sanjay Ghemawat, Google, Inc. OSDI'04: Sixth Symposium on Operating System Design and Implementation, San Francisco, Calif., Dec. 6, 2004.
Non-Patent Literature 2: "SCOPE: parallel databases meet MapReduce" Jingren Zhou, Nicolas Bruno, Ming-Chuan Wu, Per-Ake Larson, Ronnie Chaiken, Darren Shakib, Microsoft Corp., The VLDB Journal

SUMMARY

It is impossible for conventional distributed analysis systems without the MapReduce framework to write data processing flexibly.

Conventional system configurations utilizing the MapReduce framework cannot achieve processing improvement in accordance with the number of computing devices (scalability). The conventional system configurations utilizing the MapReduce framework cannot save the primary processed data at high speed when subjecting the primary processed data to secondary processing after the primary processing of the original data.

A representative example of invention disclosed in the present application is as follows.

Provided is a series data parallel analysis system performing parallel distributed processing on series data including sequential labels each associated with at least one value in a one-to-one or one-to-many relation and at least one value name to distinguish values in the series data, the parallel processing system including:

a parallel processing infrastructure configured to perform data processing in parallel, and including at least one computing device and a network for the at least one computing device to communicate data; and a distributed series data management unit configured to manage series data distributed and placed in the at least one computing device, wherein the parallel processing infrastructure includes: at least one data block on each of the at least one computing device, the at least one data block being formed from a plurality of values each associated with one of a plurality of sequential labels in the series data; at least one data block processing server configured to process the at least one data block on each of the at least one computing device; and at least one block processing aggregation server configured to process a result of the at least one data block processing server on each of the at least one computing device, and wherein the distributed series data management unit includes: a data input unit for holding the series data in the series data parallel analysis infrastructure; a data selection unit for obtaining the series data from the series data parallel analysis infrastructure; and a distribution information management database for managing the at least one data block, containing a sequential label range specifying aft range of sequential labels of the at least one data block, a series ID corresponding to a value name of the at least one data block and meta-information specifying a computing device on which the at least one data block is placed.

A series data parallel analysis infrastructure or a distributed processing system with the above described configuration allows flexible writing of distributed processing for series data. Further, a data store and a processing infrastructure with scalability for series data are accomplished. In addition, new data can be saved at high speed when processing original data retained in a data store for creating the new data.

DETAILED DESCRIPTION OF THE EMBODIMENTS

Hereinafter, embodiments of the present invention are described with reference to drawings.

Embodiment 1

Figure 1:
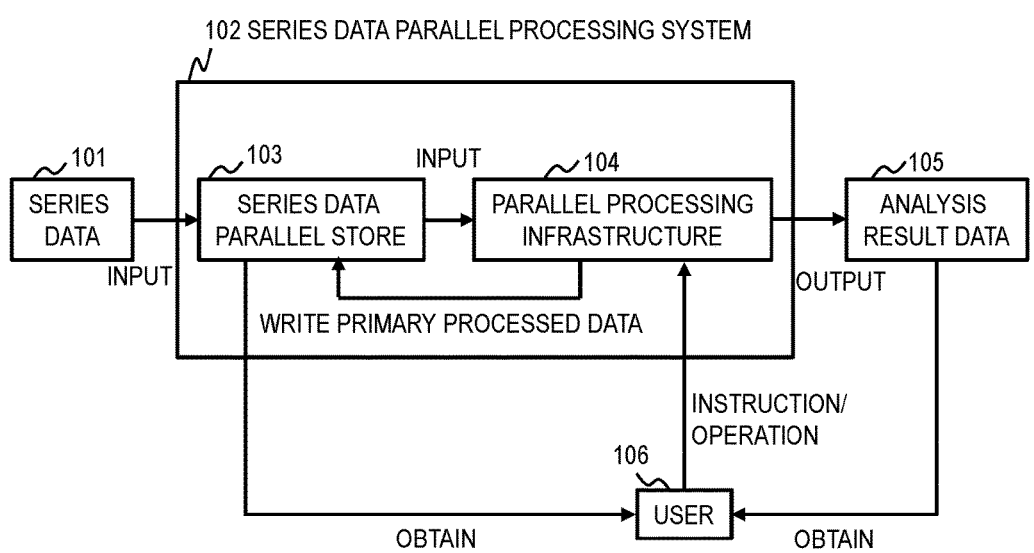
FIG. 1 is an explanatory diagram depicting the outline of a series data parallel processing system according to Embodiment 1 of the present invention.

FIG. 1 depicts the outline of a series data parallel processing system 102 according to the present invention. The series data parallel processing system 102 is configured to include a series data parallel store 103 that receives and stores series data 101, and a parallel processing infrastructure 104 that performs distributed analysis using data stored in the series data parallel store 103. The parallel processing infrastructure 104 receives a processing instruction from a user 106 and outputs the processing result as the series data parallel store 103 or analysis result data 105. The user 106 may be a person, another system or a program.

The above configuration allows series data 101 to be stored sequentially and the stored series data 101 to be analyzed using the parallel analysis infrastructure at any time requested by the user 106.

Figure 2:
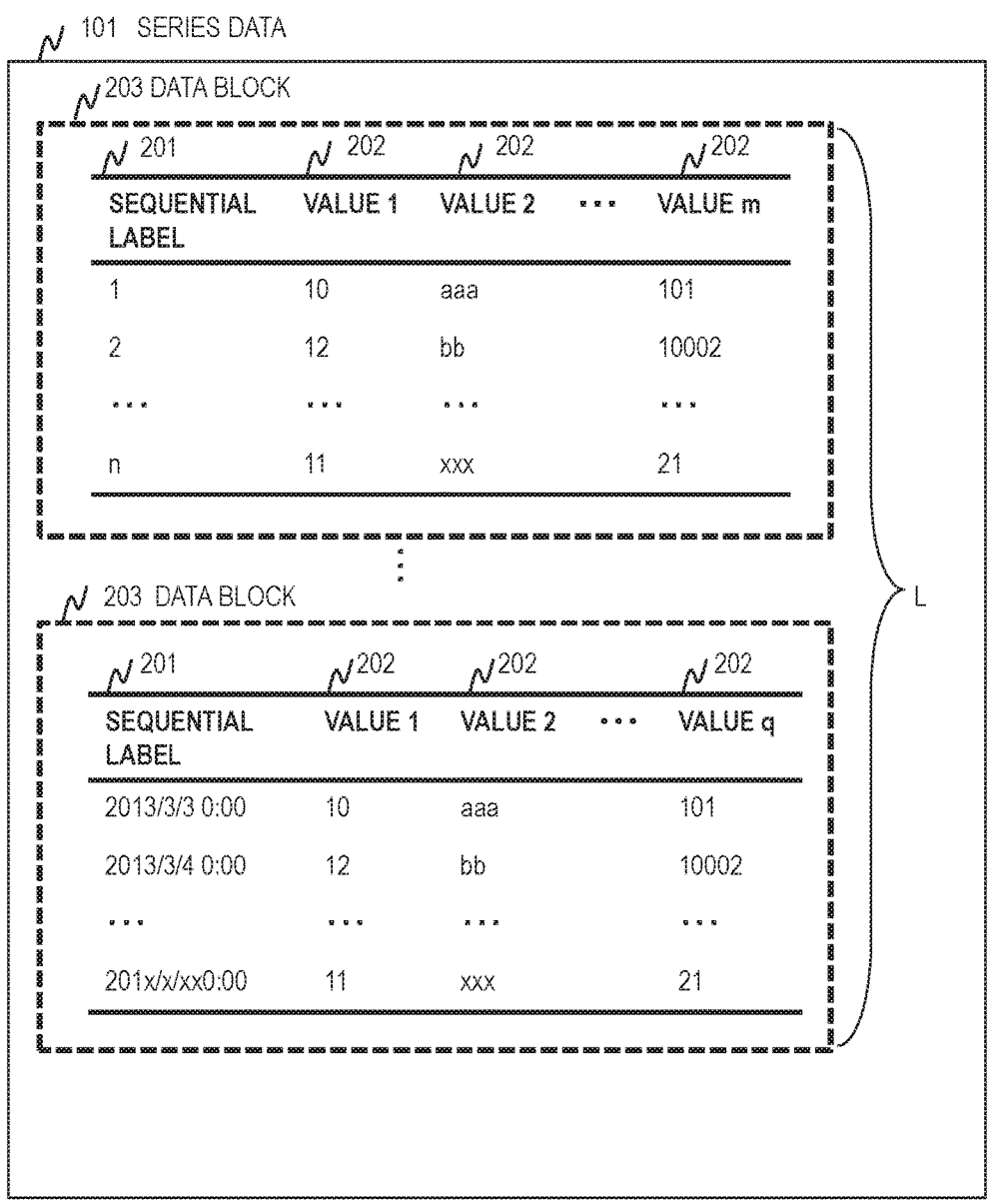
FIG. 2 is an explanatory diagram depicting the outline of series data according to Embodiment 1 of the present invention.

FIG. 2 depicts a structure of series data. Series data is configured to include one or more data blocks 203. One data block 203 is configured to include sequential labels 201 indicating a sequence and one or more types of values 202. Typically, numerical values or dates and times are used for the sequential labels. Alternatively, symbols that can define a sequence, such as a, b and c, may be used for the sequential labels.

Figure 3:
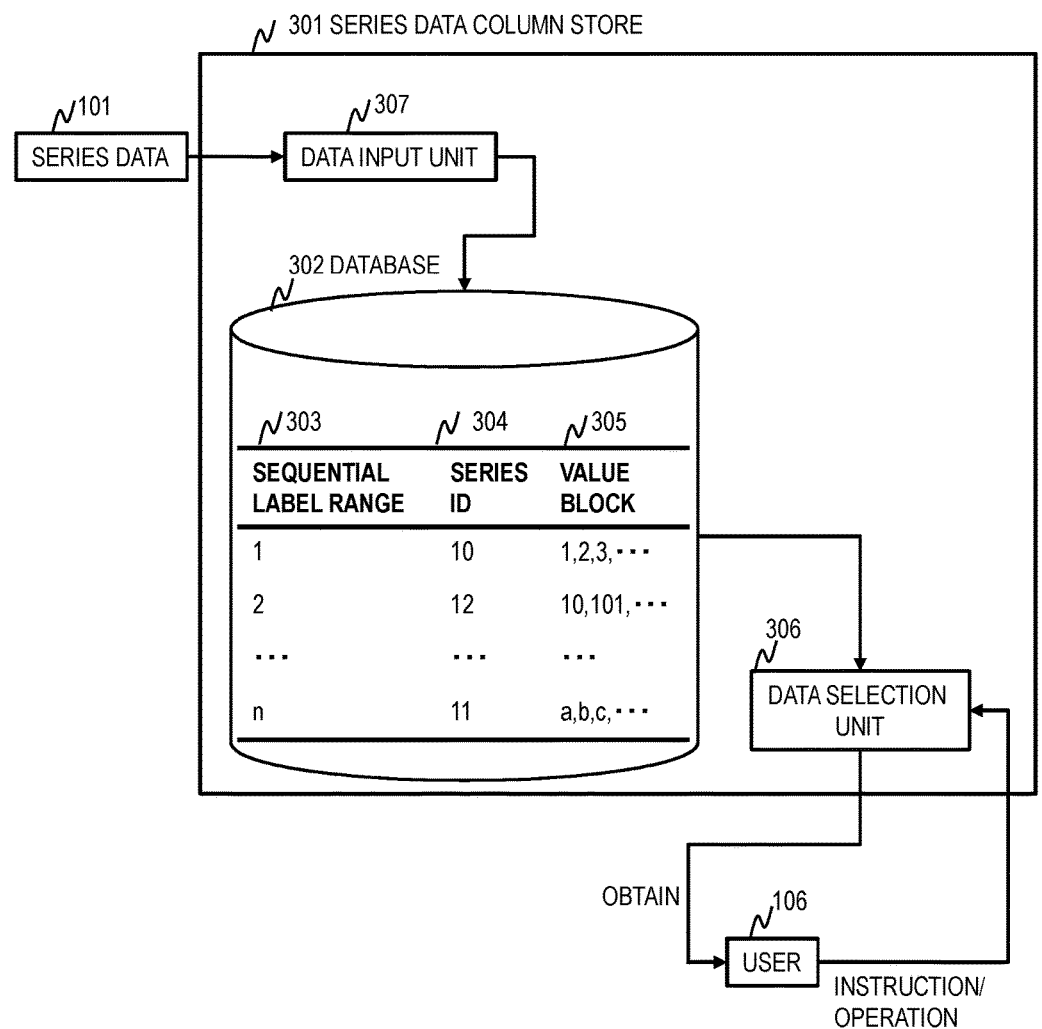
FIG. 3 is an explanatory diagram depicting a configuration of a series data column store according to Embodiment 1 of the present invention.

FIG. 3 depicts a typical configuration of a series data column store 301. The series data column store 301 is configured to include a data input unit 307 that reads the series data 101, a data base 302 that stores data, and a data selection unit 306 that obtains data. The data base 302 includes a column of sequential label range 303, a column of series ID 304 and a column of value block 305, and stores the series data 101 in the form of so-called column store. This configuration allows the user 106 to obtain data by providing an instruction/operation to the data selection unit from the user 106.

The above configuration allows the user 106 to obtain in a short time a set of sequential labels and values corresponding to a desired sequential label range 303 and a series ID 304. Further, a data compression technique applied to value blocks 305 reduces the amount of stored series data 101.

Figure 4:
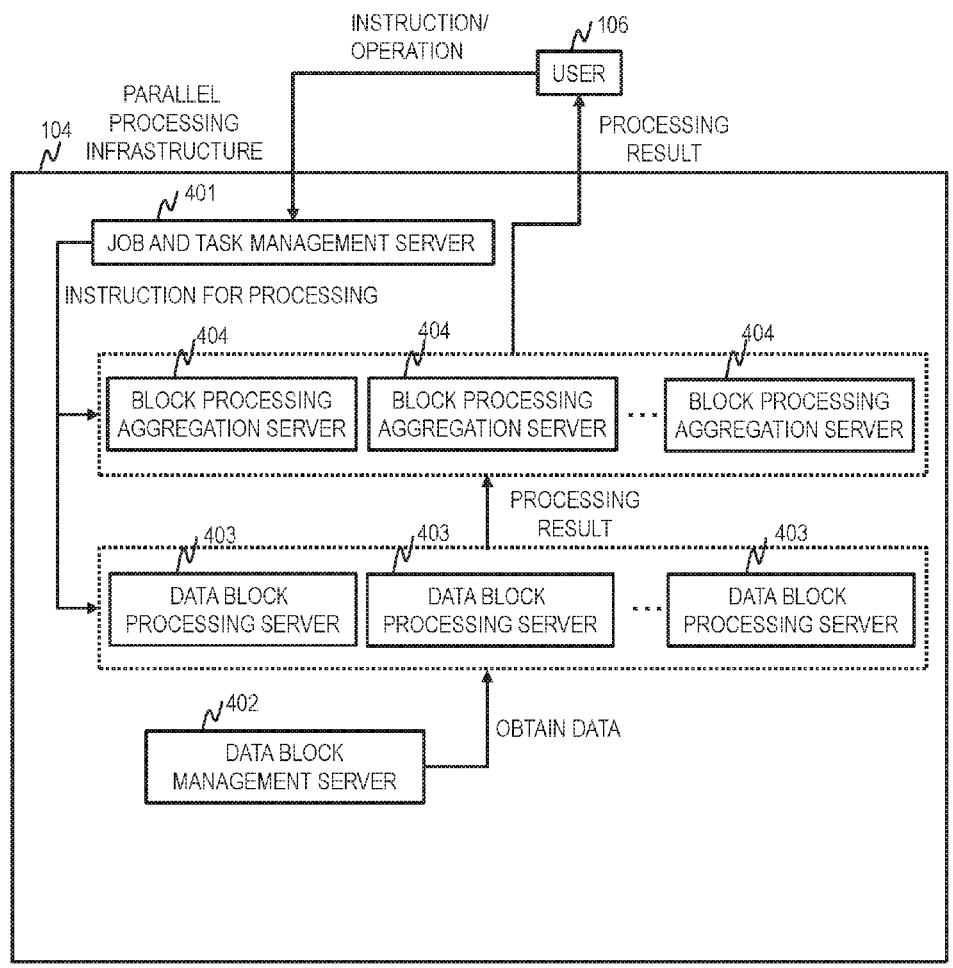
FIG. 4 is an explanatory diagram depicting a configuration of a parallel processing infrastructure according to Embodiment 1 of the present invention.

FIG. 4 depicts a typical configuration example of the parallel processing infrastructure 104. The parallel processing infrastructure 104 is configured to include a job and task management server 401 that monitors and manages the processing status, a data block management server 402 that manages data, data block processing servers 403 that process data blocks 203, and block processing aggregation servers 404 that aggregate results of the data block processing servers 403. One or more data block processing servers 403 and one or more block processing aggregation servers 404 are present, and a data block processing server 403 and a block processing aggregation server 404 may be installed on the same device. The user 106 provides an instruction/operation to the job and task management server 401 to obtain a processing result. This configuration allows writing of distributed analysis processing on various data with high flexibility and a few man-hours.

Figure 5:
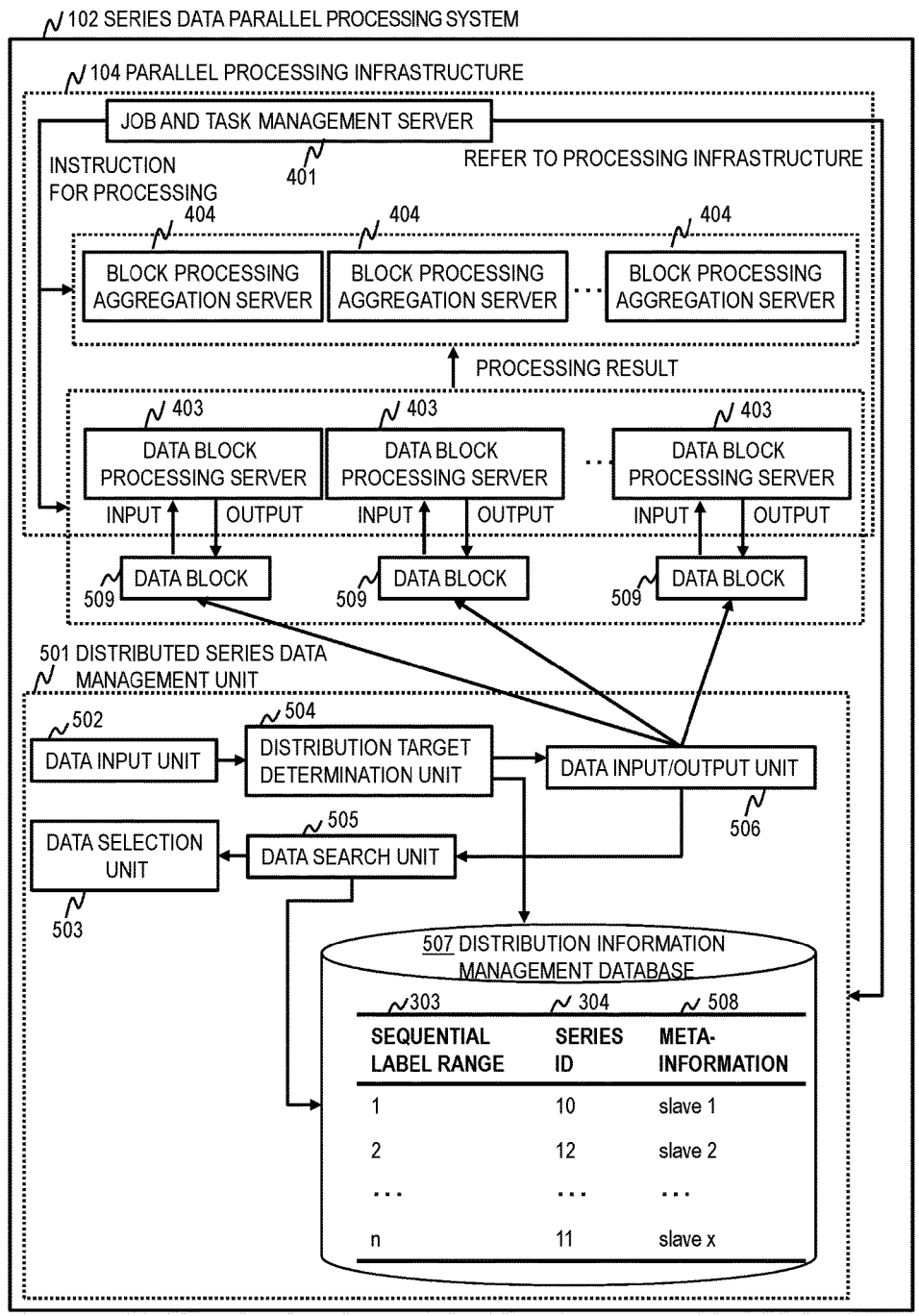
FIG. 5 is a block diagram depicting a configuration of the series data parallel processing system according to Embodiment 1 of the present invention.

FIG. 5 depicts a configuration of the series data parallel processing system 102 according to Embodiment 1 of the present invention. The series data parallel processing system 102 is configured to include the job and task management server 401 that monitors and manages the processing status, data blocks 509, the data block processing servers 403 that process the data blocks 509, the block processing aggregation servers 404 that aggregate results of the data block processing servers 403, and a distributed series data management unit 501.

The distributed series data management unit 501 is configured to include a data input unit 502, a data selection unit 503, a distribution target determination unit 504, a data search unit 505, a data input/output unit 506, and a distribution information management database 507. The distribution information management database 507 is configured to include a column of sequential label 303, a column of series ID 304, and a column of meta-information 508. The meta-information 508 contains information on servers actually holding the data blocks 509. One data block 509 may be stored in one server or a plurality of servers. When one data block 509 is stored in a plurality of servers, the meta-information 508 associated with the data block 509 contains information on the plurality of servers.

This configuration is based on the combination of the series data column store 301 illustrated in FIG. 3 and the parallel processing infrastructure 104 illustrated in FIG. 4. A feature of the configuration is that the data blocks 509 are stored in devices with the data block processing servers 403 or devices where the data block processing servers 403 can obtain data with ease, without storing the data blocks 509 in the distribution information management database 507. The data block 509 may be a file formed from the value block 305 illustrated in FIG. 3.

The above described configuration allows the series data to be stored in a plurality of servers/devices, and facilitates increasing the holding capacity in data storing or expanding the holding capacity by adding devices. Further, when the amount of data increases, the configuration can improve the analysis performance by increasing devices.

Hereinafter, the outline of operations of the series data parallel processing system 102 is described with reference to flowcharts illustrated in FIG. 6 to FIG. 11.

Figure 6:
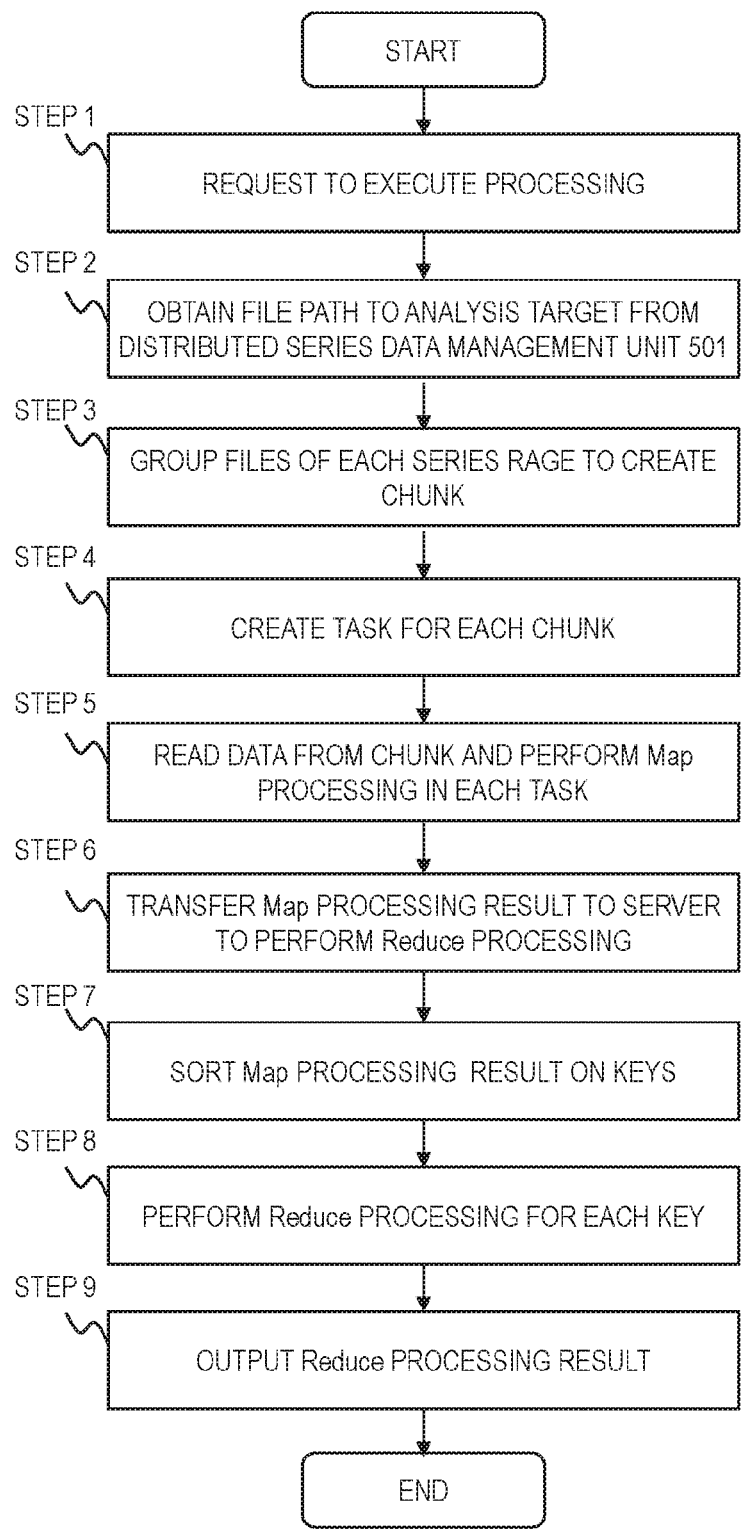
FIG. 6 is a flowchart depicting steps of series data parallel analysis processing according to Embodiment 1 of the present invention.

FIG. 6 depicts a method for distributed analysis performed by the series data parallel processing system 102. First, a processing execution request from the user 106 is issued to the series data parallel processing system 102. The processing execution request includes a sequential label range 303, a series ID 304, and a program describing the details of the processing (Step 1). Next, information indicating data blocks 509 associated with the sequential label range 303 and the series ID 304 included in the processing execution request is obtained from the distribution information management database 507 via the data search unit 505 (Step 2).

The parallel processing infrastructure 104 selects data blocks for one time extraction processing based on the information on the data blocks 509 obtained from the distribution information management database, and creates a chunk consisting of the selected data blocks. It is desirable that the data blocks and the server to perform the extraction processing for the data blocks are on the same device; however, they may be on different devices. When they are on different devices, the server to perform the extraction processing may obtain data of the data blocks 509 from the device by ssh (secure shell), scp (secure copy) and so on (Step 3). The job and task management server 401 creates an extraction task for each chunk and provides the data block processing server 403 with an instruction for the extraction task (Step 4).

The data block processing server 403 obtains data from the chunk in the order of the sequential labels, and performs the extraction processing in accordance with the program describing the details of the processing specified in Step 1. Result data of the extraction processing takes a form of values associated with sequential labels (called keys hereinafter) other than the sequential labels corresponding to the values in the data blocks 509. The key may be the same as the sequential label in the data block 509 and a plurality of labels may be associated with a key (Step 5). The result of the extraction processing is transferred to the block processing aggregation servers 404 (Step 6).

The transferred data is sorted by the keys in the block processing aggregation servers 404 (Step 7). The block processing aggregation servers 404 perform the aggregation processing for each group of values sharing a key (Step 8). Finally, the aggregation result is output, and the analysis processing ends. The output result may be stored in any type of file (tab separated text file or XML file, for example), or stored in the distributed series data management unit 501. The result may be transferred on memory to another program outside the series data parallel processing system 102 (Step 9).

In the above described configuration, the sequential label range 303 appropriately specified guarantees the sequence of data in the extraction process in Step 5. Thus, processing based on the sequence, such as moving average and Fourier transform, can be described in the extraction procedure.

Typically, the number of servers or tasks performing the aggregation processing is smaller than the extraction processing. Thus, processing based on the sequence can be described in the extraction procedure, resulting in a reduction in the transmitted amount of the result in Step 6, and low-load and high-speed distributed analysis of the series data 101.

Figure 7:
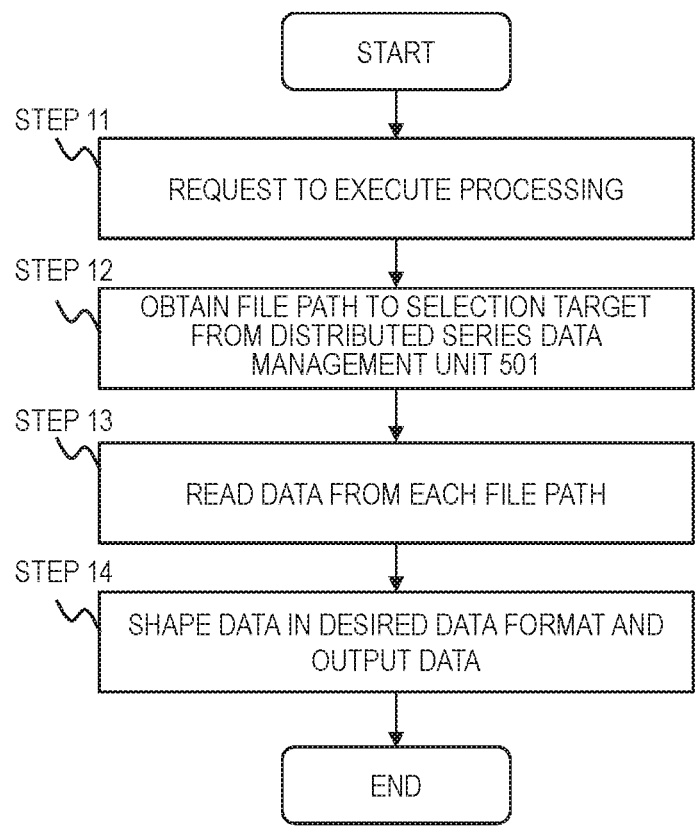
FIG. 7 is a flowchart depicting steps of data selection for a series data parallel store according to Embodiment 1 of the present invention.

FIG. 7 depicts a method for data selection by the series data parallel processing system 102.

First, a processing execution request from the user 106 is issued to the series data parallel processing system 102. The processing execution request includes a sequential label range 303 and a series ID 304 for the processing (Step 11). Next, information indicating data blocks 509 associated with the sequential label range 303 and the series ID 304 included in the processing execution request is obtained from the distribution information management database 507 via the data search unit 505 (Step 12). Data in the data blocks is transmitted to the distributed series data selection unit 503 by SSH, SCP and so on via the data input/output unit 506 and the data search unit 505 (Step 13). The data selection unit 503 converts the data into a file (tab separated text file or XML file, for example) or a form of data which can be transferred on memory to another program outside the series data parallel processing system 102, and outputs the converted data to terminate the process (Step 14). In this way, the data can be obtained without passing through the parallel processing infrastructure 104.

Figure 8:
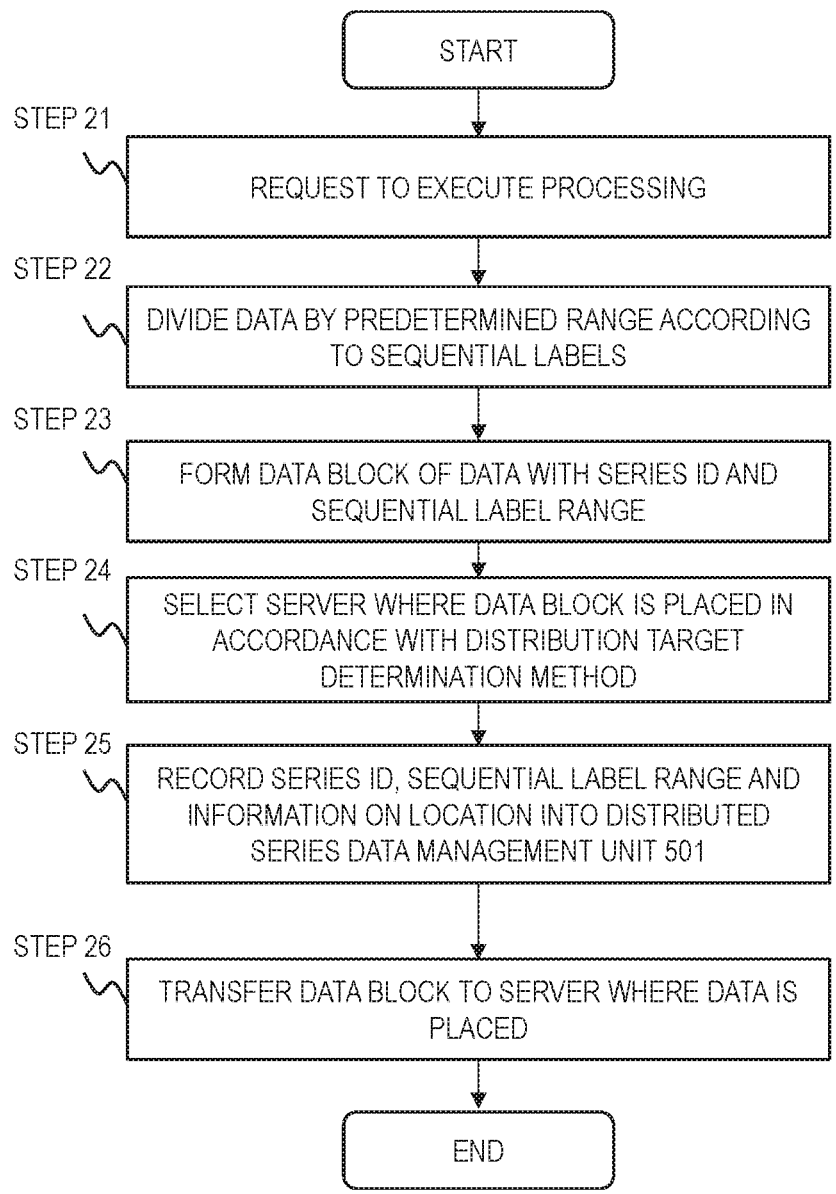
FIG. 8 is a flowchart depicting steps of data recording for the series data parallel store according to Embodiment 1 of the present invention.

FIG. 8 depicts a method for recording data by the series data parallel processing system 102.

First, a processing execution request from the user 106 is issued to the series data parallel processing system 102 via the data input unit 502. The processing execution request includes series data 101 used in the processing and series IDs 304 used in the recording (Step 21). Next, the data input unit divides the input series data in the form such as binary tab separated text file and XML with the series IDs 304 and predetermined sequential label ranges 303 (Step 22).

The data divided in Step 22 is blocked. For example, data blocks of data reduced by a compression technique are created (Step 23). It is determined which server/device holds each data block 509 in accordance with the distribution target determination method included in the distribution target determination unit 504. A plurality of servers/devices may be selected in view of availability (Step 24). The sequential label ranges 303, the series IDs 304 and the information on the distribution target servers/devices are recorded in the distribution information management database 507 (Step 25). Finally, the data blocks are disposed on the servers/devices via the data input/output unit 506 to terminate the process (Step 26).

The above described configuration allows data recording that enables determination of distribution targets in a form customizable by the user 106.

Figure 9:
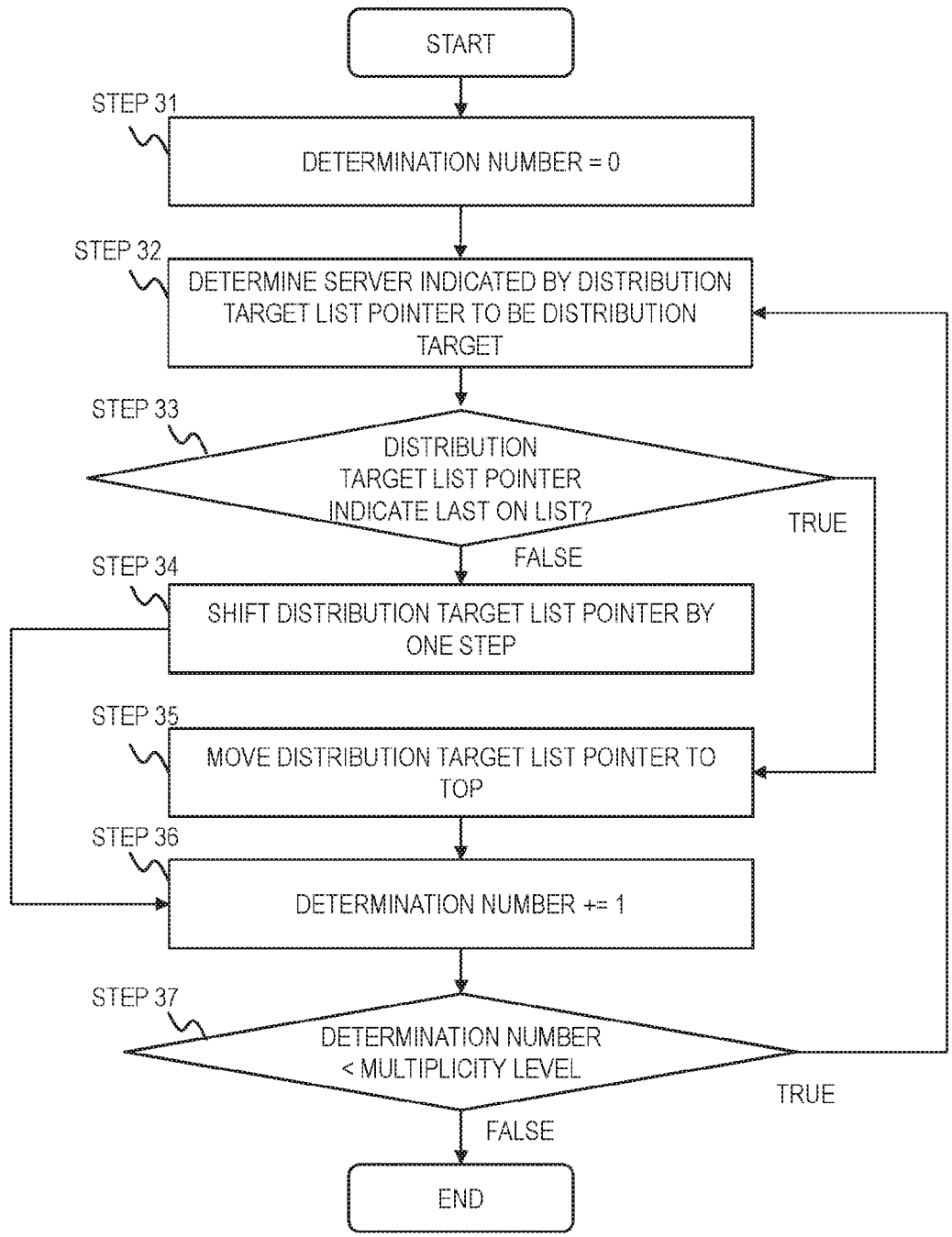
FIG. 9 is a flowchart depicting steps of determining distribution targets in the data recording for the series data parallel store according to an embodiment of the present invention.

FIG. 9 depicts an example method for determining distribution targets. The method illustrated in FIG. 9 is based on the so called round robin algorithm. This method uses a list containing information on distribution target servers/devices, and a distribution target list pointer indicating one distribution target on the list.

First, a determination number is set to be 0 (Step 31). A server/device indicated by the distribution target list pointer is determined to be a distribution target for each data block 509 (Step 32). If it is determined that the distribution target list pointer does not indicate the last distribution target on the list in Step 33, the distribution target list pointer moves one step on the list (Step 34). If the distribution target list pointer indicates the last distribution target on the list in Step 33, the distribution target list pointer moves to the top on the list (Step 35). Next, the determination number is incremented (Step 36). The above steps (Step 32 to Step 36) are repeated until the determination number reaches a predetermined multiplicity level, and then the process ends (Step 37). Thus, the data blocks 509 can be dispersed on servers/devices evenly without concentration on specific severs/devices.

Figure 10:
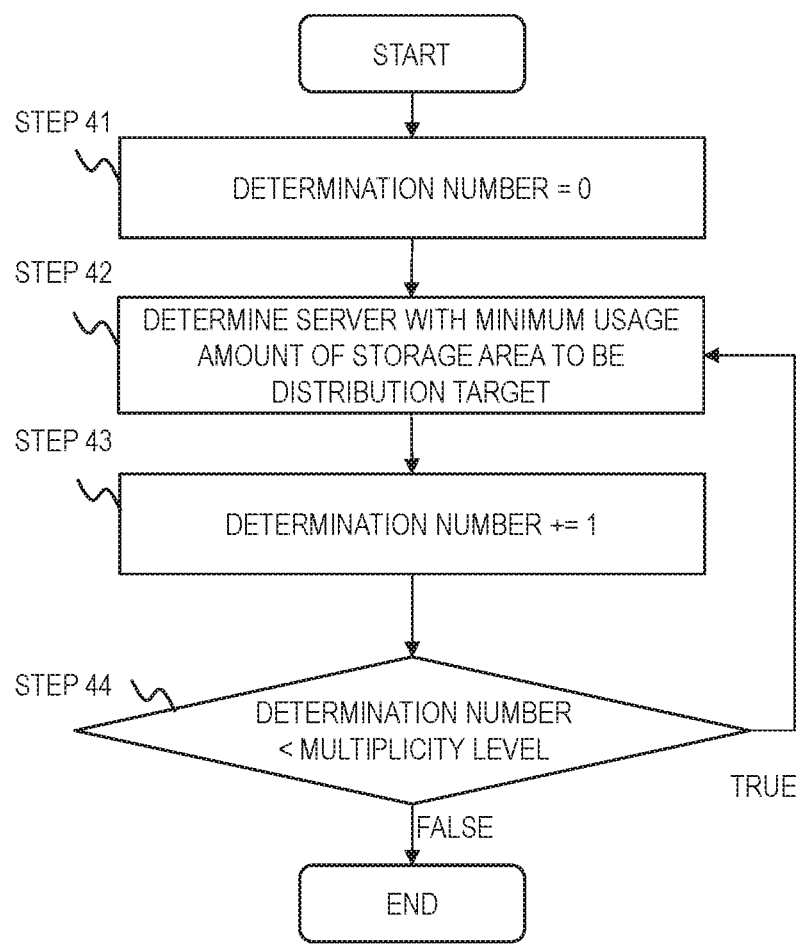
FIG. 10 is a flowchart depicting steps of determining distribution targets in the data recording for the series data parallel store according to an embodiment of the present invention.

FIG. 10 depicts an example of a distribution target determination method. The method illustrated in FIG. 10 equalizes the usage amounts of storage areas in servers/devices. The method includes steps of obtaining a distribution target list and the usage amounts of storage areas in the servers/devices on the distribution target list.

First, a determination number is set to be 0 (Step 41). The usage amount of storage area in each server/device is obtained and the server/device with the minimum usage amount of storage area is determined to be a distribution target (Step 42). Next, the determination number is incremented (Step 43). The above steps (Step 42 and Step 43) are repeated until the determination number reaches a predetermined multiplicity level, and then the process ends (Step 44). Thus, the usage amounts of storage areas in the servers/devices can be equalized.

Figure 11:
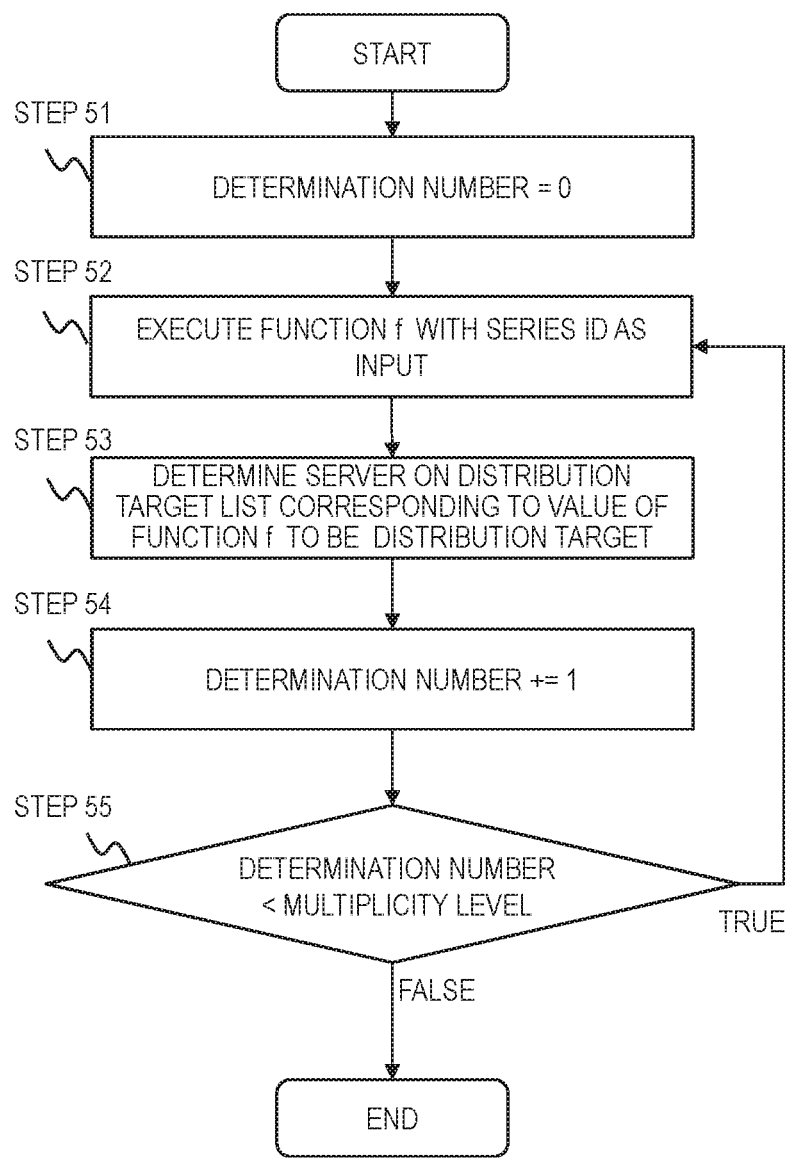
FIG. 11 is a flowchart depicting steps of determining distribution targets in the data recording for the series data parallel store according to an embodiment of the present invention.

FIG. 11 depicts an example of a distribution target determination method. The method illustrated in FIG. 11 specifies a distribution target for each series ID 304. The method uses a function f to associates servers/devices on a distribution target list with series IDs 304.

First, a determination number is set to be 0 (Step 51). The function f is executed for each data block 509 (Step 52). A server/device on the distribution target list corresponding to the value of the function f executed for a data block 509 is determined to be a distribution target for the data block 509 (Step 53). Next, the determination number is incremented (Step 54). The above steps (Step 52 to Step 54) are repeated until the determination number reaches a predetermined multiplicity level, and then the process ends (Step 55). A hash function or a modulo function may be used as the function f, for example. The series ID 304 or a value calculated from the series ID 304 may be used as an argument of the function f, for example. The function f is defined such that when an entry, such as a server, is added to or deleted from the distribution target list, and the entry, such as a server, associated with a series ID 304 is not deleted, the same entry, such as a server, is selected for the series ID 304.

Thus, distributed processing tasks of a sequential label range 303 can be executed efficiently on a plurality of infrastructures for a plurality of series IDs 304.

Figure 12:
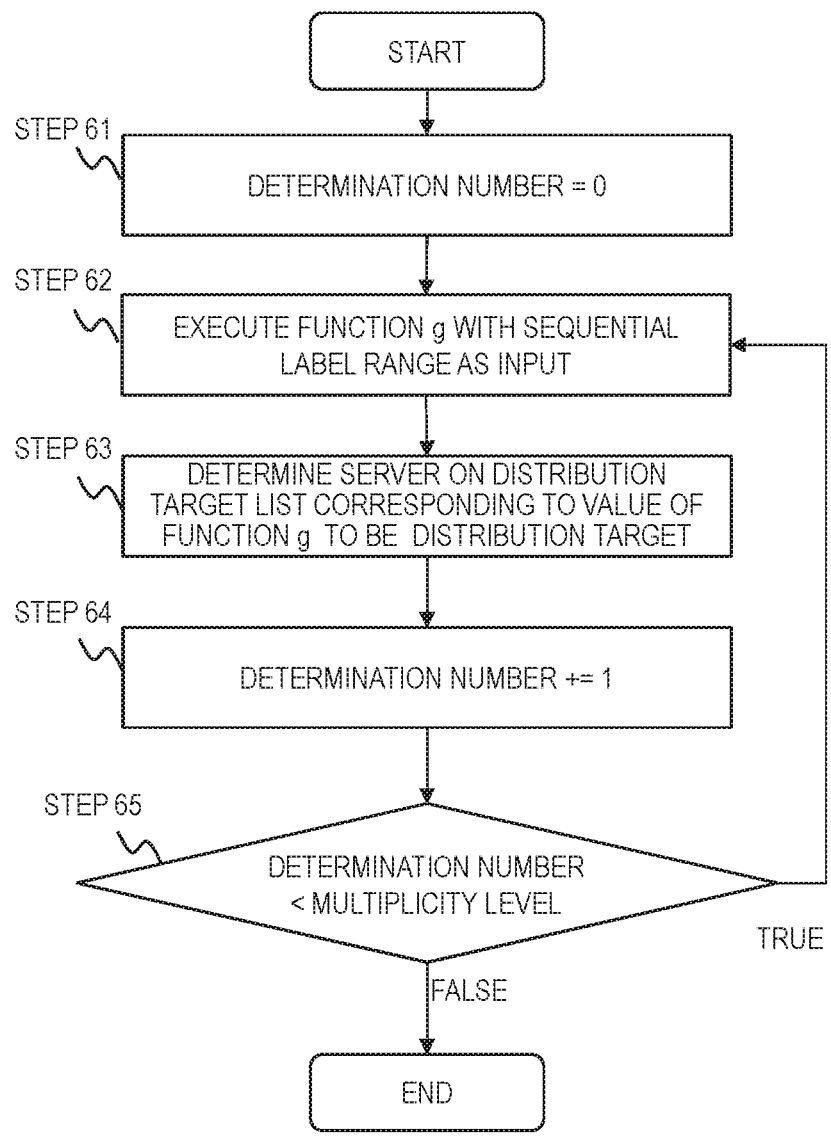
FIG. 12 is a flowchart depicting steps of determining distribution targets in the data recording for the series data parallel store according to an embodiment of the present invention.

FIG. 12 depicts an example of a distribution target determination method. The method illustrated in FIG. 12 specifies a distribution target for each sequential label range 303. The method uses a function g to associates servers/devices on a distribution target list and sequential label ranges 303.

First, a determination number is set to be 0 (Step 61). The function g is executed for each data block 509 (Step 62). A server/device on the distribution target list corresponding to the value of the function g executed for a data block 509 is determined to be a distribution target for the data block 509 (Step 63). Next, the determination number is incremented (Step 64). The above steps (Step 62 to Step 64) are repeated until the determination number reaches a predetermined multiplicity level, and then the process ends (Step 65). A hash function or a modulo function may be used as the function g, for example. The sequential label range 303 or a value calculated from the sequential label range 303 may be used as an argument of the function g, for example. The function g is defined such that when an entry, such as a server, is added to or deleted from the distribution target list, and the entry, such as a server, associated with a sequential label range 303 is not deleted, the same entry, such as a server, is selected for the sequential label range 303.

Thus, distributed processing tasks of a series ID 304 can be executed efficiently on a plurality of infrastructures for a plurality of sequential label ranges 303.

Figure 13:
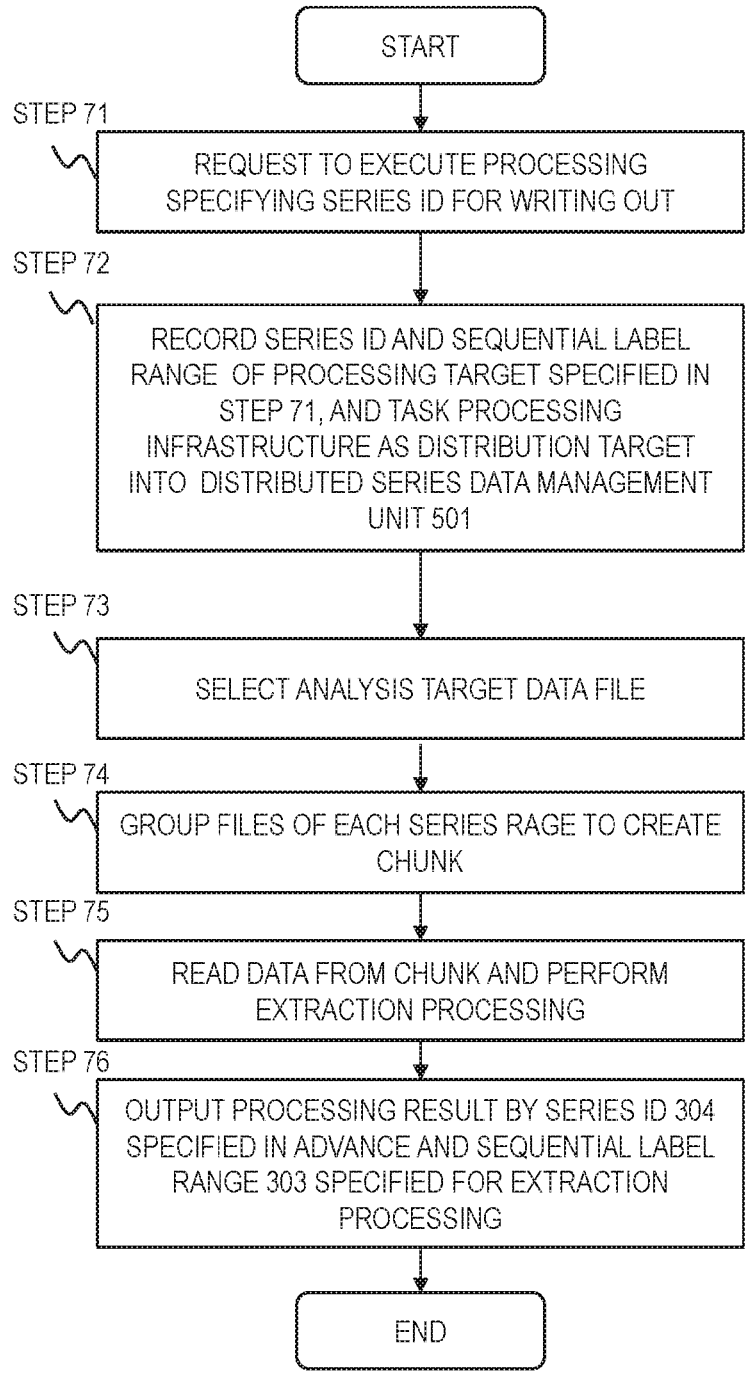
FIG. 13 is a flowchart depicting steps of data recording in Map processing for the series data parallel store according to Embodiment 1 of the present invention.

FIG. 13 depicts a method for recording data blocks in the extraction processing by the series data parallel processing system 102.

First, a processing execution request from the user 106 is issued to the series data parallel processing system 102. The processing execution request includes sequential label ranges 303 and series IDs 304 used in the processing, series IDs 304 in the data block recording, and a program describing distribution target location information and details of processing (Step 71). Next, the information indicating the data blocks 509 associated with pairs of the sequential label ranges 303 and the series IDs 304 of the processing targets included in the processing execution request is retrieved from the distribution information management database 507 via the data search unit 505. Further, the sever/devices to be the location targets of the data blocks 509 are determined, and the information is recorded in the distribution information management database in a manner similar to the manner in the data recording (Step 72). The parallel processing infrastructure 104 selects data blocks for one time extraction processing based on the information on the data blocks 509 obtained from the distribution information management database, and creates a chunk consisting of the selected data blocks in the job and task management server 401. It is desirable that the data blocks and the server to perform the extraction processing are on the same device; however, they may be on different devices. When they are on different devices, the server to perform the extraction processing may obtain data of the data blocks 509 from the device by SSH, SCP and so on (Step 73).

The job and task management server 401 creates an extraction task for each chunk and provides the data block processing server 403 with an instruction for the extraction task (Step 74). The data block processing server 403 obtains data from the chunk in the order of the sequential labels, and performs the extraction processing in accordance with the program describing the details of the processing specified in Step 71 (Step 75). When data blocks are recorded in the extraction processing, the data of the extraction processing result is transformed into the form of the data block 509 with the time ranges the same as the chunks subjected to the extraction tasks and the series IDs 304 specified in Step 71, and written to the servers/devices determined in Step 72 (Step 76). Then, the process ends. The data blocks may be placed by communication means such as SSH and SCP; however, it is possible to reduce the communication traffic by placing the data blocks at the same servers/devices performing the extraction processing on the data blocks to the extent possible.

Thus, when data is recorded after aggregation processing, data transmission or data writing for or after the aggregation processing is reduced, resulting in the reduction of workloads on the system and the higher speed of the system operations.

Figure 14:
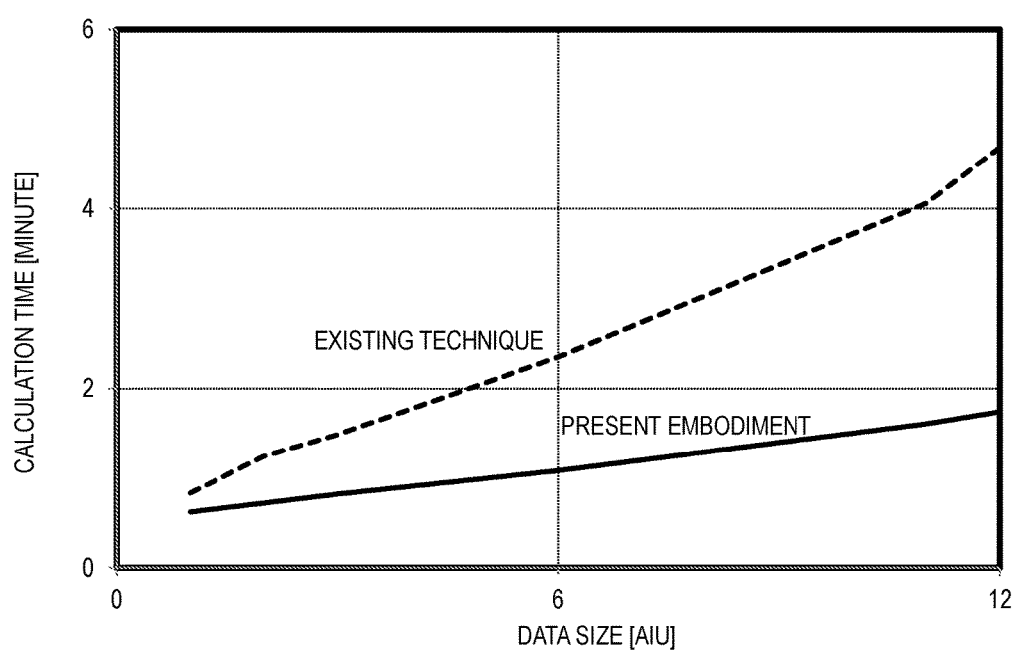
FIG. 14 is an explanatory diagram depicting an advantage of Embodiment 1 of the present invention.

FIG. 14 depicts the comparison of processing times for calculating a moving average between the series data parallel processing system 102 and an existing distributed analysis infrastructure. They had the same system device configuration, and used five data block processing servers and five block processing aggregation servers.

Both infrastructures took approximately 30 seconds in the calculation time for the initial setting of the parallel processing infrastructures. The present embodiment was approximately five times faster than the existing technique. This is because the present embodiment allows calculation of the moving average in the data block processing servers. As described above, the present embodiment allows flexible writing of various kinds of analysis processing for series data, and establishing a series data parallel processing system capable of increasing the data storage area and the calculation performance for analysis processing with an increase of the number of devices.

Embodiment 2

Figure 15:
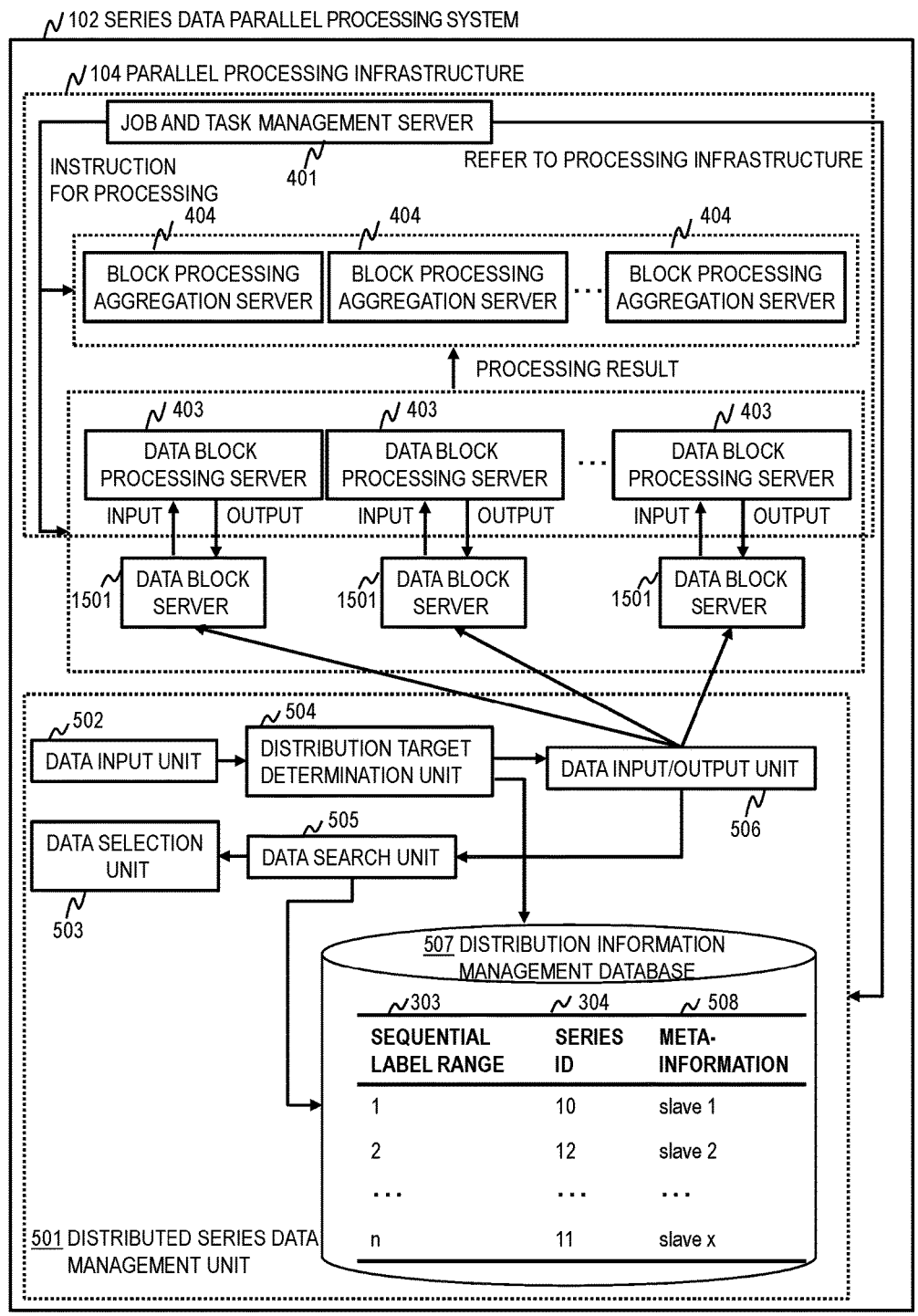
FIG. 15 is a block diagram depicting Embodiment 2 of the present invention.

Embodiment 2 is different from Embodiment 1 in that Embodiment 2 stores a data block in a data block server 1501 instead of holding the data block in a file directly. FIG. 15 depicts a configuration example of the series data parallel processing system 102 according to Embodiment 2.

The series data parallel processing system 102 is configured to include the job and task management server 401 that monitors and manages the processing status, data block servers 1501, the data block processing servers 403 that process data blocks 509 provided from the data block servers 1501, the block processing aggregation servers 404 that aggregate results of the data block processing servers 403, and the distributed series data management unit 501.

The distributed series data management unit 501 is configured to include the data input unit 502, the data selection unit 503, the distribution target determination unit 504, the data search unit 505, the data input/output unit 506, and the distribution information management database 507. The distribution information management database 507 is configured to include the column of sequential label 303, the column of series ID 304, and the column of meta-information 508. The meta-information 508 contains information on the data block servers 1501 actually holding the data blocks 509. One data block 509 may be stored in one data block server 1501 or a plurality of data block servers 1501. When one data block 509 is stored in a plurality of data block servers 1501, the meta-information 508 associated with the data block 509 contains information on the plurality of data block servers 1501.

This configuration is based on the combination of the series data column store 301 illustrated in FIG. 3 and the parallel processing infrastructure 104 illustrated in FIG. 4. A feature of the configuration is that the data block servers 1501 are stored in the devices with data block processing servers 403 or devices where the data block processing servers 403 can obtain data with ease, without storing the data blocks 509 in the distribution information management database 507. The data block 509 may be a file created from the value block 305 illustrated in FIG. 3, and the data block 509 is held in the data block server 1501.

The above described configuration allows the series data to be stored in a plurality of servers/devices, and facilitates increasing the holding capacity in data storing or expanding the holding capacity by adding devices. Further, when data increases, the configuration can improve the analysis performance by increasing devices Hereinafter, the outline of operations of the series data parallel processing system 102 is described with reference to flowcharts illustrated in FIG. 16 and FIG. 17.

Figure 16:
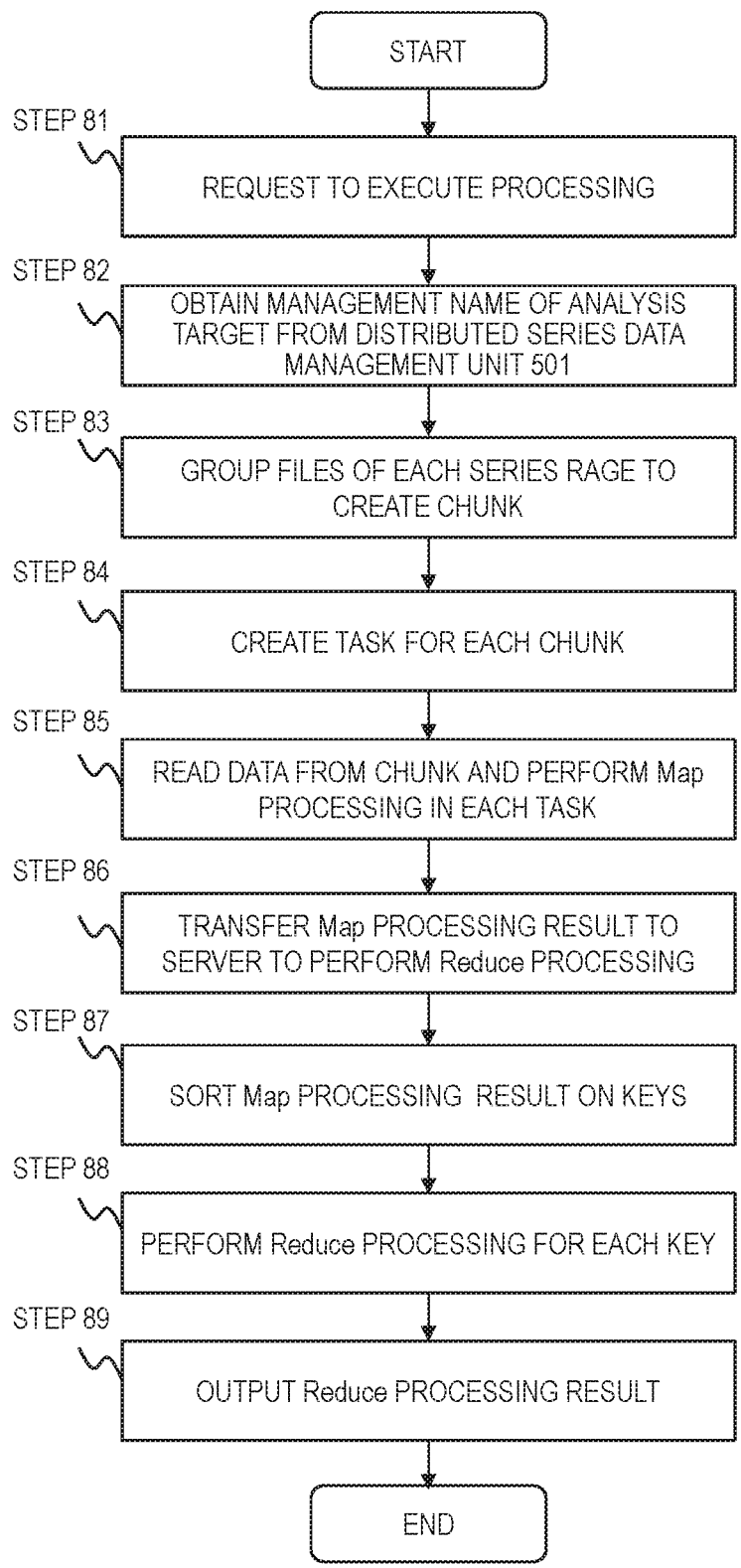
FIG. 16 is a flowchart depicting steps of series data parallel analysis processing according to Embodiment 2 of the present invention.

FIG. 16 depicts a method for distributed analysis performed by the series data parallel processing system 102.

First, a processing execution request from the user 106 is issued to the series data parallel processing system 102. The processing execution request includes a sequential label range 303, a series ID 304, and a program describing the details of the processing (Step 81). Next, information indicating data blocks 509 associated with the sequential label range 303 and the series ID 304 included in the processing execution request are obtained from the distribution information management database 507 via the data search unit 505 (Step 82).

The parallel processing infrastructure 104 selects data blocks for one time extraction processing based on the information on the data blocks 509 obtained from the distribution information management database, and creates a chunk consisting of the selected data blocks (Step 83). It is desirable that the data block server 1501 and the server to perform the extraction processing are on the same device; however, they may be on different devices. When they are on different devices, the server to perform the extraction processing may obtain data of the data blocks 509 from the device by SSH, SCP and so on.

Next, the job and task management server 401 creates an extraction task for each chunk and provides the data block processing server 403 with an instruction for the extraction task (Step 84). The data block processing server 403 obtains data from the chunk in the order of the sequential labels, and performs the extraction processing in accordance with the program describing the details of the processing specified in Step 81. Result data of the extraction processing takes a form of values associated with sequential labels (called keys hereinafter) other than the sequential labels corresponding to the values in the data blocks 509. The key may be the same as the sequential label in the data block 509 and a plurality of labels may be associated with a key (Step 85).

Next, the result of the extraction processing is transferred to the block processing aggregation server 404 (Step 86). The transferred data is sorted on the keys in the block processing aggregation servers 404 (Step 87). The block processing aggregation servers 404 perform the aggregation processing for each group of values sharing a key (Step 88).

Finally, the aggregation result is output, and the analysis processing ends. The output result may be stored in any type of file (tab separated text file or XML file, for example), or stored in the distributed series data management unit 501.

The result may be transferred on memory to another program outside the series data parallel processing system 102 (Step 89).

In the above described configuration, the sequential label range 303 appropriately specified guarantees the sequence of data in the extraction process in Step 85. Thus, processing based on the sequence, such as moving average and Fourier transform, can be described in the extraction procedure.

Typically, the number of servers or tasks performing the aggregation processing is smaller than the extraction processing. Thus, processing based on sequence can be described in the extraction procedure, resulting in a reduction in the transmitted amount of the result in Step 86, and low-load and high-speed distributed analysis of the series data 101.

Figure 17:
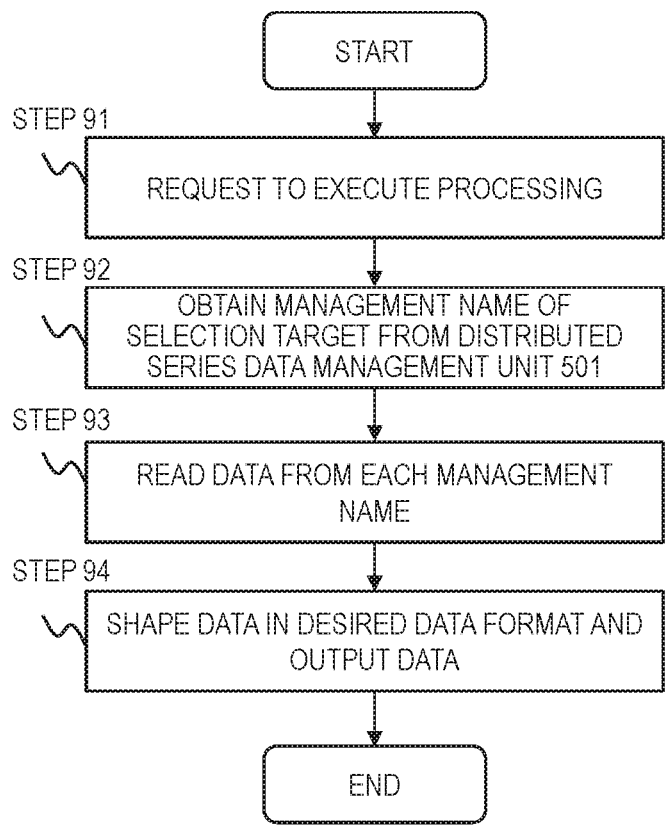
FIG. 17 is a flowchart depicting steps of data selection for the series data parallel store according to Embodiment 2 of the present invention.

FIG. 17 depicts a method for data selection by the series data parallel processing system 102.

First, a processing execution request from the user 106 is issued to the series data parallel processing system 102. The processing execution request includes a sequential label range 303 and a series ID 304 for the processing (Step 91). Next, information indicating data blocks 509 associated with the sequential label range 303 and the series ID 304 included in the processing execution request is obtained from the distribution information management database 507 via the data search unit 505 (Step 92). Data in the data blocks is transmitted to the distributed series data selection unit by SSH, SCP and so on via the data block servers 1501, the data input/output unit 506 and the data search unit 505 (Step 93). The data selection unit converts the data into a file (tab separated text file or XML file, for example) or a form of data which can be transferred on memory to another program outside the series data parallel processing system 102, and outputs the converted data to terminate the process (Step 94). In this way, the data can be obtained without passing through the parallel processing infrastructure 104.

REFERENCE SINGS LIST

101 Series data
102 Series data parallel processing system
103 Series data parallel store
104 Parallel processing infrastructure
105 Analysis result data
106 User
201 Sequential label
202 Value
203 Data block
302 Data base
303 Sequential label range
304 Series ID
305 Value block
306 Data selection unit
307 Data input unit
401 Job task management server
402 Data block management server
403 Data block processing server
404 Block processing aggregation servers
501 Distributed series data management unit
502 Data input unit
504 Distribution target determination unit
505 Data search unit
506 Data input/output unit
507 Distribution information management database
508 Meta-information
509 Data block
1501 Data block server

What is claimed is:

1. A series data parallel processing system configured to perform parallel distributed processing on series data, the series data including sequential labels each associated with data items in a one-to-one or one-to-many relation, the parallel processing system comprising:
   a parallel processing infrastructure configured to perform data processing in parallel, and including a plurality of computing devices operable in parallel, each computing device including a memory and a processor and a network for the computing devices to communicate data; and
   a distributed series data management unit configured to manage the series data distributed and placed in the computing devices,
   wherein the parallel processing infrastructure includes:
   each of the computing devices having:
   a memory configured to store data blocks, each data block formed from a plurality of data items each associated with one of a plurality of the sequential labels in the series data and a series ID corresponding to a value name of the data block; and
   a data block processing server configured to process the data blocks; and
   an associated block processing aggregation server configured to process a result of the data block processing server on each of the data blocks, and
   wherein the distributed series data management unit includes:
   a data input unit system memory configured to hold the series data in the series data parallel processing system;
   a data selection unit configured to obtain the series data from the system memory; and
   a distribution information management database having a processor configured to manage and distribute the data blocks such that each data block contains a sequential label range specifying a range of sequential labels of the data block, the series ID and meta-information specifying a respective computing device or series of computing devices on which the data block is placed; and
   wherein the distributed series data management unit includes a distribution target determination unit configured to cyclically determine in a round robin manner for each data block a computing device to hold the data block using the sequential label range or sequential label ranges sharing at least half sequential labels such that the determined computing device has a minimum usage amount of storage device capacity to be the computing device to hold each respective data block.

2. The series data parallel processing system according to claim 1, wherein the distribution target determination unit determines which computing device to hold data blocks with respect to each series ID.

3. The series data parallel processing system according to claim 1, wherein at least one data block is in a file format.

4. The series data parallel processing system according to claim 1, wherein at least one computing device includes a data block server.

5. A method for performing parallel distributed processing on series data, being data including sequential labels each associated with data items in a one-to-one or one-to-many relation, using a parallel processing infrastructure including a plurality of computing devices and a network for the computing devices to communicate data, the method comprising:

preparing, on selected ones of the computing devices, one or more data blocks, each data block formed from a plurality data items each associated with one of a plurality of sequential labels in the series data and a series ID corresponding to a value name of the data block;

using a data block processing server to process the respective data blocks on each of the computing devices;

using a block processing aggregation server to process a result of the data block processing server on each of the computing devices;

with respect to each of the data blocks, holding and managing a sequential label range specifying a range of sequential labels of the data block, the series ID and meta-information specifying a respective computing device on which the data block is placed, as distribution information management database for managing the data block in a distributed series data management unit managing the series data distributed and placed in the computing devices; and a distribution target determination unit cyclically determining in a round robin manner for each data block a computing device to hold the data block using the sequential label range or sequential label ranges sharing at least half sequential labels such that the determined computing device has a minimum usage amount of storage device capacity to be the computing device to hold each respective data block.

* * * * *